Patented Jan. 17, 1939

2,143,897

UNITED STATES PATENT OFFICE 2,143,897

RUBBER COMPOSITIONS AND METHODS OF MAKING THE SAME

Alfonso C. Oriola, Bronx, N. Y., assignor of one-half to Nicolo Lo Cicero

No Drawing. Application March 18, 1937, Serial No. 131,637

1 Claim. (Cl. 106—23)

This invention relates to rubber compositions and methods of making the same. It is particularly directed to rubber compositions for use in manufacturing automobile or truck tires, rubber heels, shoe rubbers, galoshes or other rubber articles subject to traction in use, it being a dominant object of the invention to increase the non-skid or traction quality of such articles by imparting enhanced non-skid or traction quality to the rubber composition of which such articles are manufactured.

A further object of this invention is to provide, a relatively inexpensive crude rubber composition of the character described which may be used or worked in the usual manner in fabricating various rubber articles subject to rubbing or traction in use, and which composition may now be employed in connection with other materials or ingredients in the manufacture of such articles. For example, in the making of rubber tires, my improved rubber composition may be used in the usual manner either alone or with other fabric as when making cord tires.

Another object of this invention is to provide a rubber composition and method of producing the same which may vary in specific proportions of the ingredients composing the same, depending upon the articles ultimately to be made from said composition.

A still further object of this invention is to provide a highly improved and economical process for producing rugged rubber composition having a great variety of practical uses.

Other objects of my invention will hereinafter appear in the following specification and the novel features thereof will be particularly pointed out in the appended claim.

A dominant feature of my invention is the addition to rubber composition now known and in use, pumice, preferably in pulverized form to enhance the non-skid or traction quality of the rubber, whereby the same may be used in the making of rubber tires, rubber heels, shoe rubbers, galoshes and the like rubber articles, subject to traction in use. Other pulverized, gritty or powdered pumiceous material such as powdered silica or alumina may be substituted for the pulverized pumice.

In the making of my rubber composition to be used in rubber tires, the composition may include smoked rubber, zinc oxide, carbon black, powdered antimony, sulphur, rosin and pulverized pumice. The pulverized pumice should be about 15% of the composition.

A rubber composition for making rubber tires and having substantially the following proportions has been found to give good results:

| | Per cent |
|---|---|
| Smoked rubber (in sheets) | 49 |
| Zinc oxide | 15 |
| Carbon black | 10 |
| Antimony | 6 |
| Sulphur | 3 |
| Rosin | 2 |
| Pumice (pulverized) | 15 |

In carrying out my improved process, the smoked rubber sheets may first be masticated in a usual cylinder (heated by steam) for about one hour. Carbon black is thereafter added gradually while the cylinder operates for about five or ten minutes to thoroughly mix the carbon black. The antimony is then added while the cylinder continues to operate to thoroughly mix the antimony.

The zinc oxide and pulverized pumice are preferably separately mixed together, and the mixture added to the mixture of rubber, carbon black and zinc oxide. The resulting mixture is agitated and mixed in the cylinder for about twenty minutes.

The rosin is then added and about five minutes later the sulphur is added, while the cylinder continues to operate for twenty to twenty five minutes. After thorough mixing the uncured rubber composition is taken out of the cylinder in sheet form.

Although one rubber composition has been described as illustrative, it will be understood that the composition may vary as to the ingredients, proportions, or process of making, depending upon the article ultimately to be made from the composition, it being a dominant feature of the invention to enhance the traction quality of the composition with pulverized pumice or other pumiceous powdered material.

It will thus be seen that I have provided an article and method in which the several objects of this invention are achieved and which are adapted to meet the conditions of practical use.

As various possible embodiments might be made of the above invention, and as various changes might be made in the embodiment above set forth, it is to be understood that all matter herein set forth, is to be interpreted as illustrative and not in a limiting sense.

Having thus described my invention, I claim as new and desire to secure by Letters Patent:

A crude rubber composition comprising the following ingredients in substantially the following proportions

| | Per cent |
|---|---|
| Smoked rubber | 49 |
| Zinc oxide | 15 |
| Carbon black | 10 |
| Antimony | 6 |
| Sulphur | 3 |
| Rosin | 2 |
| Pumice (powdered) | 15 |

ALFONSO C. ORIOLA.